United States Patent
Juels et al.

(10) Patent No.: US 6,970,070 B2
(45) Date of Patent: Nov. 29, 2005

(54) METHOD AND APPARATUS FOR SELECTIVE BLOCKING OF RADIO FREQUENCY IDENTIFICATION DEVICES

(75) Inventors: Ari Juels, Brookline, MA (US); Ronald L. Rivest, Arlington, MA (US); Michael Szydlo, Brighton, MA (US)

(73) Assignee: RSA Security Inc., Bedford, MA (US)

( * ) Notice: Subject to any disclaimer, the term of this patent is extended or adjusted under 35 U.S.C. 154(b) by 65 days.

(21) Appl. No.: 10/673,540

(22) Filed: Sep. 29, 2003

(65) Prior Publication Data

US 2004/0223481 A1 Nov. 11, 2004

Related U.S. Application Data

(60) Provisional application No. 60/471,187, filed on May 16, 2003, and provisional application No. 60/468,750, filed on May 8, 2003.

(51) Int. Cl.[7] .......................... H04Q 5/22; G08B 13/14
(52) U.S. Cl. .......................................... 340/10.1; 455/1
(58) Field of Search .............................. 340/10.1, 10.2, 340/568.1, 572.1, 572.2, 572.3; 235/385; 455/1

(56) References Cited

U.S. PATENT DOCUMENTS

| | | | | | |
|---|---|---|---|---|---|
| 6,061,344 | A | * | 5/2000 | Wood, Jr. | 340/10.2 |
| 2004/0100359 | A1 | * | 5/2004 | Reade et al. | 340/10.1 |
| 2004/0160324 | A1 | * | 8/2004 | Stilp | 340/572.1 |

OTHER PUBLICATIONS

S.A. Weis et al., "Security and Privacy Aspects of Low–Cost Radio Frequency Identification Systems," Proceedings of the First International Conference on Security in Pervasive Computing, 12 pages, 2003.
S.A. Weis, "Security and Privacy in Radio–Frequency Identification Devices," Master of Science Thesis, MIT, pp. 1–79, May 2003.
A. Juels et al., "Squealing Euros: Privacy Protection in RFID–Enabled Banknotes," Financial Cryptography, Springer–Verlag, 18 pages, 2003.
P. Golle et al., "Universal Re–encryption of Mixnets," Springer–Verlag, 14 pages, 2002.
D.L. Brock, "The Electronic Product Code (EPC): A Naming Scheme for Physical Objects," White Paper, MIT–AUTOID–WH–002, MIT Auto–ID Center, http://www.autoid-center.org., pp. 1–21, Jan. 2001.
Auto–ID Center Technical Report, "13.56 MHz ISM Band Class 1 Radio Frequency Identification Tag Interface Specification: Recommended Standard, Version 1.0.0," MIT–AUTOID–TR–011, MIT Auto–ID Center, http://autoidcenter.org, pp. 1–31, Feb. 2003.
S. Garfinkel, "An RFID Bill of Rights," Technology Review, p. 35, Oct. 2002.
S.E. Sarma et al., "RFID Systems, Security & Privacy Implications," White Paper, MIT–AUTOID–WH–014, MIT Auto–ID Center, pp. 1–16, Nov. 2002.
S.E. Sarma et al., "Radio–Frequency Identification: Security Risks and Challenges," RSA Laboratories, CryptoBytes, vol. 6, No. 1, pp. 1–32, Spring 2003.
D.W. Engels, "HF Identity Tag Action Group: Scope and Deliverables," Technical Report, MIT–AUTOID–TR–020, MIT Auto–ID Center, pp. 1–5, Jul. 2003.

* cited by examiner

Primary Examiner—Brian Zimmerman
Assistant Examiner—Clara Yang
(74) Attorney, Agent, or Firm—Ryan, Mason & Lewis, LLP

(57) ABSTRACT

Techniques are disclosed for providing enhanced privacy in an RFID system comprising a plurality of RFID devices, each having an associated identifier, and at least one reader which communicates with one or more of the devices. A blocker device is operative to receive a communication directed from the reader to one or more of the RFID devices, and to generate, possibly based on information in the received communication, an output transmittable to the reader. The output simulates one or more responses from at least one of the RFID devices in a manner which prevents the reader from determining at least a portion of the identifier of at least one of the RFID devices. The blocker device may itself comprise one of the RFID devices. In an illustrative embodiment, the output generated by the blocker device interferes with the normal operation of a singulation algorithm implemented by the reader.

31 Claims, 3 Drawing Sheets

METHOD AND APPARATUS FOR SELECTIVE BLOCKING OF RADIO FREQUENCY IDENTIFICATION DEVICES

RELATED APPLICATIONS(S)

The present application claims the priority of U.S. Provisional Patent Application Ser. No. 60/468,750, filed May 8, 2003 and entitled "The Wildcard-Tag: Selective Jamming for Consumer Privacy," and U.S. Provisional Patent Application Ser. No. 60/471,187, filed May 16, 2003 and entitled "The Blocker Tag: Selective Blocking of RFID Tags for Consumer Privacy," the disclosures of which are incorporated by reference herein.

FIELD OF THE INVENTION

The present invention relates generally to radio frequency identification (RFID) tags or other types of RFID devices, and more particularly to techniques for providing enhanced privacy in conjunction with the use of such devices.

BACKGROUND OF THE INVENTION

A conventional RFID tag typically comprises an integrated circuit transceiver capable of transmitting a unique serial number or other identifying information to a nearby reader in response to a query from the reader. Many RFID tags are "passive" in that they do not include a battery or other power source, but instead obtain the power necessary to operate from the query signal itself. RFID tags are expected to replace printed barcodes in consumer product applications. Also, ongoing RFID tag development efforts have led to significant cost and size reductions, which should result in a rapid proliferation of RFID tags into many new areas of use. For example, proposals have recently been made to integrate RFID tags into currency.

The impending ubiquity of RFID tags, however, also poses a potentially widespread threat to consumer privacy. The simplest RFID tag will broadcast its unique identifying information to any nearby reader. The movements of a given consumer or other user can therefore be readily tracked by simply monitoring the RFID tags in goods carried by or otherwise associated with that user.

A number of conventional approaches attempt to address the privacy threats associated with RFID tags.

A straightforward approach for the protection of consumer privacy is to "kill" RFID tags before they are placed in the hands of consumers. More specifically, an RFID tag can be killed upon purchase of the tagged product, by sending a special kill command to the tag. A killed tag is truly dead, and can never be re-activated. As an example, a supermarket might use RFID tags to facilitate inventory management and monitoring of shelf stocks. To protect consumer privacy, checkout clerks would kill the tags of purchased goods, such that no purchased goods would contain active RFID tags. There are many environments, however, in which simple measures like kill commands are unworkable or undesirable for privacy enforcement. For example, consumers may wish RFID tags to remain operative while in their possession, so as to be utilizable by home appliances or other user devices equipped with RFID tag readers.

Another approach involves shielding an RFID tag from scrutiny by enclosing it in a Faraday cage, that is, a container made of metal mesh or foil that is impenetrable by RF signals. RFID tags will inevitably see use, however, in a vast range of objects, including clothing and wristwatches, that cannot be placed conveniently in containers. Faraday cages thus represent at best only a partial solution to the consumer privacy problem.

Active jamming of RF signals is another, related physical means of shielding RFID tags from view. A consumer could carry a device that actively broadcasts RF signals so as to block or otherwise disrupt the operation of any nearby RFID tag readers. This crude approach raises legal issues relating to broadcast power levels, and could cause severe disruption of all nearby RFID systems, even those in legitimate applications where privacy is not a concern.

Another general approach is to make the RFID tags "smarter," so that they interact with readers in a way that better protects privacy, while still providing the desired active functionality. This would typically involve the use of cryptographic methods. More particular examples requiring cryptographic functionality implemented on the tags themselves include the "hash-lock" and "silent tree-walking" techniques described in S. A. Weis et al., "Security and privacy aspects of low-cost radio frequency identification systems," Proceedings of the First International Conference on Security in Pervasive Computing, 2003, and S. A. Weis, "Radio-frequency identification security and privacy," Master's thesis, MIT, June 2003. However, the severe cost constraints on basic RFID tags may preclude implementation of such tag-based cryptographic functionality in practical applications.

Other techniques of this type which avoid the need for tag-based cryptographic functionality include the external agent re-encryption technique described in A. Juels and R. Pappu, "Squealing Euros: Privacy protection in RFID-enabled banknotes," Financial Cryptography '03, R. Wright, editor, Springer-Verlag, 2003; and the universal re-encryption technique described in P. Golle et al., "Universal re-encryption for mixnets," 2002. However, these re-encryption techniques require significant computational infrastructure external to the tags, and are thus likely to be unduly burdensome in practice.

It is therefore apparent that a need exists for improved techniques for providing cost-effective consumer privacy protections in practical RFID tag applications, in such a manner that the legitimate tracking capabilities of the tags are not undermined, and without requiring the use of tag-based cryptographic functionality or additional computational infrastructure external to the tags.

SUMMARY OF THE INVENTION

The present invention in accordance with one aspect thereof provides techniques for enhanced privacy in an RFID system. The RFID system generally includes a plurality of RFID devices, each having an associated identifier, and at least one reader which communicates with one or more of the devices. A blocker device is operative to receive a communication directed from the reader to one or more of the RFID devices, and to generate, possibly based on information in the received communication, an output transmittable to the reader. The output simulates one or more responses from at least one of the RFID devices in a manner which prevents the reader from determining at least a portion of the identifier of at least one of the RFID devices. The blocker device may itself comprise one of the RFID devices, and thus may have one of the identifiers associated therewith.

In an illustrative embodiment, the output generated by the blocker device interferes with the normal operation of a singulation algorithm implemented by the reader, by selectively blocking the reader from singulating certain device identifiers in a designated privacy zone or in accordance with a specified privacy policy. The singulation algorithm may be a tree-walking singulation algorithm, an ALOHA singulation algorithm, or any other type of singulation algorithm utilizable by a reader in determining particular device identifiers.

Advantageously, an RFID device or other blocker device configured to include a selective blocking feature in accordance with the invention provides enhanced consumer privacy, without significantly undermining the effectiveness of the device as a tracking mechanism prior to consumer possession thereof. Moreover, such protection is provided in a particularly cost-effective manner, without significantly increasing the complexity of the RFID devices or the device reader.

These and other features and advantages of the present invention will become more readily apparent from the accompanying drawings and the following detailed description.

DETAILED DESCRIPTION OF THE PREFERRED EMBODIMENTS

The present invention will be described herein with reference to an exemplary RFID system in which multiple RFID devices communicate with an RFID device reader. It is to be appreciated, however, that the invention is not restricted to use in this or any other particular RFID system configuration.

The term "RFID device" as used herein is intended to include an RFID tag or any other type of device configurable for transmission of device-identifying information via radio frequency communications. Although the following description will refer primarily to RFID tags, it is to be understood that the techniques disclosed are more generally applicable to other types of RFID devices.

The device-identifying information may be a serial number or any other type of identifier, also generally referred to herein as an ID. It should be noted that not every identifier in a given set of unique identifiers need have a corresponding realized device.

The term "blocker device" as used herein is intended to include a blocker tag or other RFID device, or more generally any other type of device, which incorporates full or selective blocking functionality in accordance with the invention. A blocker device may therefore be an RFID tag or other RFID device configurable for transmission of device-identifying information via radio frequency communications, or may be another type of device which is not so configurable or does not otherwise have an identifier associated therewith. For example, a blocker device may comprise a mobile telephone, a portable computer, a personal digital assistant (PDA), a hardware-based authentication token such as an RSA SecurID™ token commercially available from RSA Security Inc. of Bedford, Mass., U.S.A., or any other type of processing device in which full or selective blocking functionality in accordance with the invention may be implemented.

The term "reader" as used herein is intended to include any type of device capable of interacting with an RFID tag or other RFID device so as to receive device-identifying information therefrom.

Figure 1:
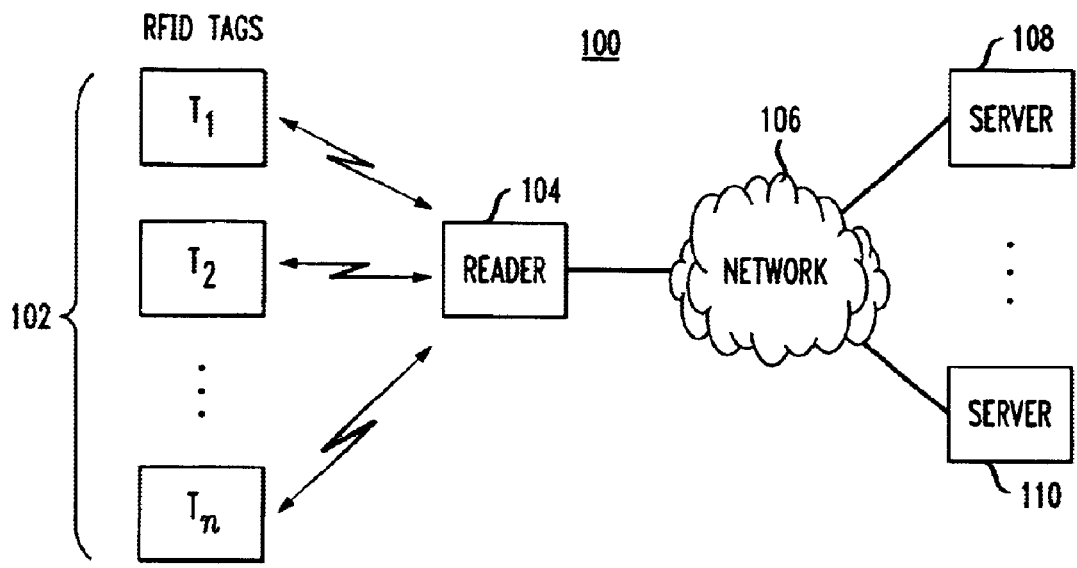
FIG. 1 is simplified block diagram of an example RFID system in which the present invention is implemented.

FIG. 1 shows an RFID system 100 in which the present invention is implemented. The system 100 includes a number of RFID tags 102, more particularly denoted $T_1, T_2, \ldots T_n$, and an RFID reader 104. The notation $T_1, T_2, \ldots T_n$ is also used herein to refer to the particular tag IDs of the tags 102. The reader 104 communicates with the tags 102 and receives identifying information therefrom, utilizing the techniques of the present invention. The reader 104 is coupled via a network 106 to servers denoted 108, 110.

In accordance with an aspect of the invention, one or more of the tags 102 are configured with an ability to block the operation of a singulation algorithm utilized by the reader 104 in order to provide enhanced privacy for a user of the tag. A given tag configured in this manner is referred to herein as a "blocker tag." The manner in which such tags interfere with the operation of the reader 104 will be described in greater detail below.

The network 106 may represent a global computer network such as the Internet, a wide area network (WAN), a local area network (LAN), a satellite network, a telephone or cable network, or various portions or combinations of these and other types of networks. The servers 108, 110 may be conventional processor-based information processing devices of a type conventionally utilized in conjunction with RFID readers in an RFID system.

The particular number n of tags 102 in the system 100 is purely arbitrary, and the system can be configured to support any desired number of tags. Also, although only a single reader 104 is shown in the figure for simplicity and clarity of illustration, the system will typically include multiple readers. Furthermore, it should be noted that a given reader need not be connected to a network, and may instead operate as a stand-alone device.

Figure 2:
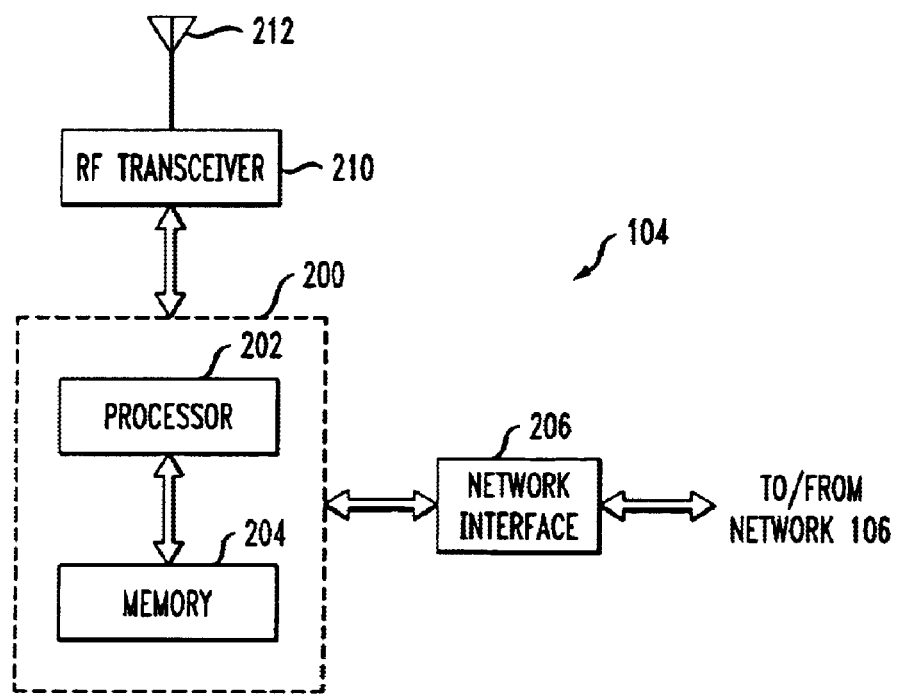
FIG. 2 illustrates one possible implementation of an RFID device reader of the FIG. 1 system.

FIG. 2 shows one possible implementation of the reader 104 of the FIG. 1 system. The reader in this implementation includes a processing block 200, comprising a processor 202 coupled to a memory 204, a network interface 206, an RF transceiver 210, and an antenna 212. One or more of these elements may be implemented in whole or in part as a conventional microprocessor, digital signal processor, application-specific integrated circuit (ASIC) or other type of circuitry, as well as portions or combinations of such circuitry elements. Software programs for controlling the operation of the reader 104 may be stored in the memory 204 and executed by the processor 202.

As indicated previously, the present invention in accordance with one aspect thereof implements one or more of the tags 102 as blocker tags. Such tags are configurable to disrupt the normal operation of the reader in a manner that provides enhanced privacy protection without undermining the effectiveness of the tags as a tracking mechanism prior to consumer possession thereof. This is achieved in the preferred embodiments by selectively interfering with a singulation algorithm implemented by the reader.

A given RFID tag in accordance with the invention generally includes circuitry comprising memory, processing logic and an RF transceiver. These elements may be configured in a manner similar to that used in conventional RFID tags, with straightforward modification to implement a blocking technique as described herein.

A typical RFID reader is generally only able to communicate with a single RFID tag at a time. If more than one tag responds to a query by the reader, the reader detects a collision and executes a singulation algorithm which allows the reader to communicate with the conflicting tags one at a time.

Conventional RFID tag systems typically operate at a frequency of either 13.56 MHz or 915 MHz. Those operating at 915 MHz commonly utilize a tree-walking singulation algorithm, while those operating at 13.56 MHz usually utilize an ALOHA singulation algorithm. Other frequencies, such as 125 kHz and 2.45 GHz, are also used, and employ similar singulation algorithms.

The blocking techniques of the present invention will initially be described with reference to an illustrative embodiment in which the reader 104 is assumed to utilize a conventional tree-walking singulation algorithm to determine the ID associated with a particular RFID tag.

Examples of selective blocking in this tree-walking singulation context will be described in conjunction with FIGS. 3, 4 and 5. Other embodiments of the invention, based on an ALOHA singulation algorithm, will then be described in conjunction with FIGS. 6 and 7.

The tree-walking singulation algorithm enables the reader 104 to identify the IDs of nearby tags individually by means of a bit-by-bit query process resembling a depth-first search of a binary tree.

Assume that the tags 102 in the system 100 of FIG. 1 bear unique IDs of a fixed bit-length k. Example values of k include 64, 96 or 128, although any value can be used.

Let ∥ denote the concatenation operator for bit strings.

The set of all possible k-bit IDs can be viewed as the leaves of a standard binary tree of depth k. The root of this tree has depth 0 and is labeled with the empty string. A node of depth d is labeled with a binary string x of length d; if d<k, then the node has two children at depth d+1: a "left child" with label x0, and a "right child" with label x1. (Here x0 means x ∥ 0 and x1 means x ∥ 1.)

We regard the branches of a given node in this tree as bearing labels '0' and '1', associated with the respective left and right branches. Thus a node at depth d in this tree may be uniquely identified by a binary prefix $B=b_1b_2 \ldots b_d$, representing the sequence of branch labels of branches traversed in a path from the root to the node. It follows that each of the $2^k$ leaves in the tree has a unique associated k-bit string. We view each such leaf as representing a distinct possible tag ID.

The tree-walking singulation algorithm is a recursive depth-first search performed by a reader 104 in the following manner.

Let the subtree of a given node of the tree denote all the descendents of that node in the tree.

The reader initiates the tree-walking singulation algorithm at the root of the tree.

Starting at a given node $B=b_1b_2 \ldots b_d$, the reader queries all tags bearing IDs in the leaves of the corresponding subtree, i.e., all tags whose IDs bear the prefix B; all other tags are instructed to remain silent.

The queried tags reply to the reader with the d+1-st bit in their IDs; i.e., each tag broadcasts a '0' if it lies in the left subtree of the node B, and a '1' if it lies in the right subtree.

Consequently, if there are tags in both the left and right subtrees of B, then the tags together simultaneously broadcast both a '0' and a '1', creating a collision in the broadcast bit.

In this case, when a collision is detected, the reader recurses (sequentially in turn) beginning at its child nodes B ∥ 0 and B ∥ 1.

If, on the other hand, the tags all reply with only a single bit b, i.e., they all lie in the same subtree, then the reader recurses on the node B ∥ b, and ignores the other (empty) subtree.

When the algorithm reaches a leaf (at depth k), it outputs the associated k-bit sequence, which is the ID of the tag just read. The full output of the singulation algorithm is a list of the IDs of all tags within range.

The running time of this singulation algorithm is bounded by the product of k and the number of tags being read.

It should be noted that the particular tree-walking algorithm described in detail above is simply one type of tree-walking algorithm that may be utilized in conjunction with the invention. Numerous variants of this particular tree-walking algorithm, as well as other types of tree-walking algorithms, may also be used. For example, one such variant may involve transforming the order of the identifier bits using a fixed permutation. This would help reduce the number of collisions in initial bits, since unique identifiers carry more randomness than, e.g., product identifiers.

Figure 3:
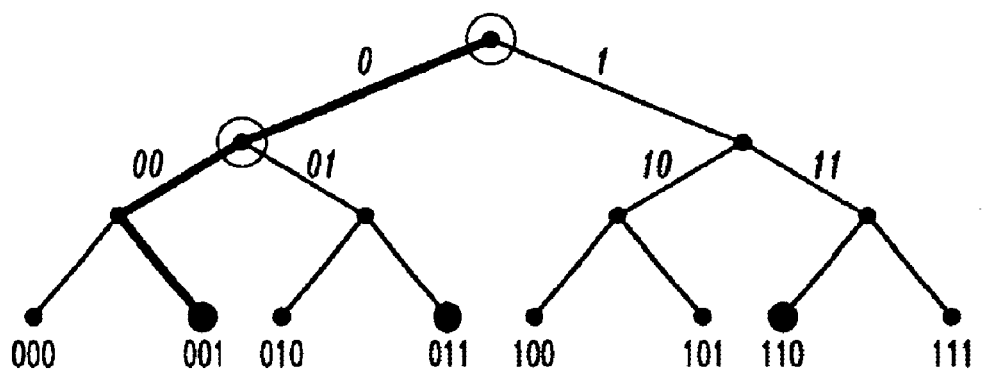
FIG. 3 shows an example of a tree-walking algorithm utilizable in an illustrative embodiment of the invention.

FIG. 3 shows a simple example illustrating the operation of the particular tree-walking singulation algorithm described in detail above. The binary tree shown in the figure is of depth 3, and has $2^3=8$ unique tag IDs represented at its leaves. The prefixes associated with subtrees are denoted in italics.

In this example, we consider three tags as being present, namely the '001', '011' and '110' tags. These are indicated by large black circles at their respective leaves.

The tree-walking singulation algorithm here first singulates the '001' tag. It does this by following the path denoted by the darkened edges. At two nodes, namely the root of the tree and the root for all tags with a '0' prefix, there are collisions in the bits broadcast by the tags, because there are tags present in both the left and right subtrees. We denote these collision-points with hollow circles. Singulation of the '011' and '110' tags would follow by recursion on the collision points.

A property of the tree-walking singulation algorithm is that all tags whose IDs share a common prefix lie in a common subtree.

Thus, for example, if all products produced by a particular manufacturer share a common prefix, all IDs on tags for products of that manufacturer lie in a common subtree. These IDs are all scanned sequentially by the tree-walking singulation algorithm.

More generally, different ID prefixes may correspond to different zones of the space of possible IDs. For example, all IDs beginning with a '1' may be viewed as being in a "privacy zone," or all IDs beginning with '010' may be viewed as being in a "recycling zone." The careful allocation of ID prefixes allows the establishment of multiple zones of IDs that may be utilized in conjunction with the selective blocking techniques of the invention, as will be described in greater detail below.

As mentioned previously, one or more RFID tags, referred to herein as blocker tags, are configured to deliberately interfere with the tree-walking singulation protocol. A blocker tag in the illustrative embodiment does not engage in an active form of jamming. Rather, by participating in the tag-reading process in a non-compliant way, it performs what may be thought of as a kind of passive jamming.

In one possible implementation, a given blocker tag simulates the full spectrum of possible tag IDs, thereby obscuring the IDs of all tags. The blocker tag in this case effectively overwhelms the tree-walking singulation protocol by forcing it to sweep the full space of all possible tag IDs, which is extremely large.

More specifically, a basic blocker tag of this type simulates the full set of $2^k$ possible tag IDs, and is also referred to herein as a full blocker tag or a universal blocker tag. Such a blocker tag, when carried by a consumer, creates a physical region of privacy protection in which a reader is incapable of singulating tags.

In operation, whenever the reader queries the tags in the subtree of a given node B for their next bit value, the full blocker tag simultaneously broadcasts both a '0' bit and a '1' bit. This may be accomplished, for example, by equipping the blocker tag with two distinct antennae, or using other suitable transmission mechanisms. These and numerous possible implementations of the blocker tag will be readily apparent to those skilled in the art given the teachings provided herein. The forced collision directs the reader to recurse on all nodes, thereby causing the reader to explore the entire tree.

If the reader had enough time, memory, and processing power to complete the tree-walking singulation algorithm in these circumstances, it would output the entire set of all $2^k$ possible tag IDs. However, this set is very large, and the reading process is designed to execute very rapidly. In practice, therefore, the reader may be expected to stall after reaching only a few hundred leaves in the tree. The net effect is that the full blocker tag "blocks" the reading of all tags.

In other implementations, a blocker tag in accordance with the invention may be configured to prevent singulation across certain restricted ranges of tag IDs. Thus, it is possible to designate a particular zone, that is, a range of IDs, such as all those with a leading '1' bit, as subject to the privacy protection of the blocker tag. Such a blocker tag is referred to herein as a selective blocker tag or a partial blocker tag. As will be shown below, this selective-blocking feature may be used to protect items in the hands of consumers, while at the same time permitting unimpeded reading of tags in commercial environments.

Figure 4:
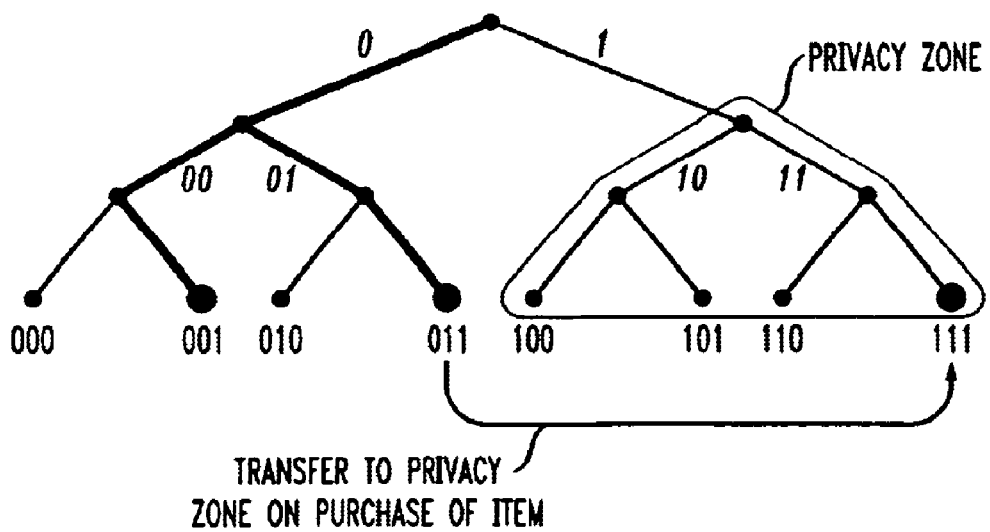
FIG. 4 illustrates the manner in which a privacy zone can be created in the tree-walking example of FIG. 3 utilizing the techniques of the invention.

FIG. 4 illustrates how such a privacy zone can be created in the k=8 example of FIG. 3. The tree structure shown in FIG. 4 is the same as that of FIG. 3. However, in the FIG. 4 arrangement, a privacy zone is created in the right subtree of the root node. The privacy zone is created by configuring the selective blocker tag such that it replies to the reader only during that portion of the execution of the tree-walking singulation algorithm that corresponds to the right subtree of the root node. This selective-blocking feature would have the effect of obstructing only the reading of tags that bear a '1' prefix in their IDs, while tags having IDs that begin with a '0' bit could be read without interference. A selective blocker tag can thus target a particular zone for protection.

Also, a given tag can be transferred from outside the privacy zone into the privacy zone, for example, upon purchase of a corresponding tagged item by a consumer. This transfer process is also illustrated in FIG. 4, which shows the '011' tag being transferred into the privacy zone by flipping its first bit from '0' to '1'.

Transfers may also be made from within the privacy zone to outside the privacy zone, in a similar manner.

Such transfers may be controlled through use of a personal identification number (PIN), a password, a cryptographic authentication mechanism, or other suitable technique.

Figure 5:
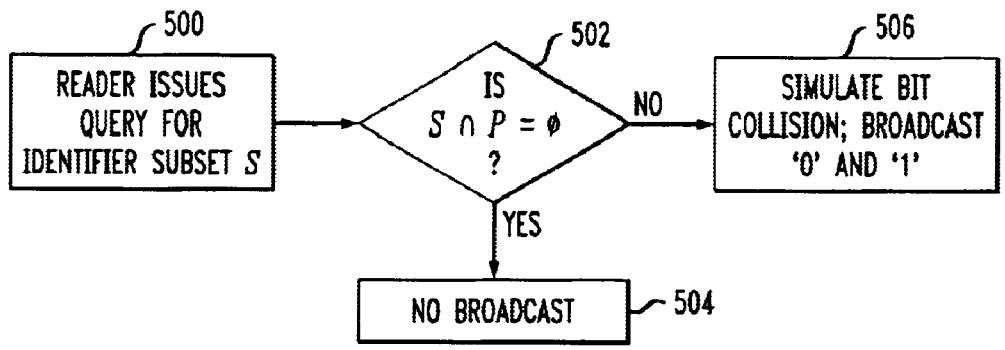
FIGS. 5, 6 and 7 are flow diagrams of example processes for implementing selective blocking with specified privacy zones in the RFID system of FIG. 1.

FIG. 5 is a flow diagram showing an example selective blocking process implemented in the system 100 using the techniques of the invention.

In step 500, reader 104 issues a query for an ID subset S in conjunction with a tree-walking singulation algorithm of the type previously described. A given one of the RFID tags 102 configured as a selective blocker tag having a privacy zone P then performs the operations shown in steps 502, 504 and 506. In step 502, the selective blocker tag determines if the intersection of S and P is the empty set. If so, the selective blocker tag makes no broadcast, as indicated in step 504. Otherwise, the selective blocker tag simulates a bit collision in step 506 by broadcasting both a '0' and a '1'.

Advantageously, a given selective blocker tag may be easily and inexpensively configured so as to block reading of all tag IDs with an arbitrary prefix or set of prefixes. More generally, a selective blocker tag may be designed to simulate, and thus block the reading of, tag IDs satisfying any of a number of specified conditions, such as those matching a given regular expression.

It should also be noted that a full or selective blocker tag may be used in a malicious manner, namely as a tool for mounting denial-of-service attacks. Such a blocker tag might be a full blocker tag that shields the full spectrum of IDs from reading, or might be a selective blocker tag that targets a particular range, for example, the set of IDs assigned to a particular manufacturer. A malicious blocker tag of this type might be used to disrupt business operations or to help perpetrate petty theft by shielding merchandise from inventory-control mechanisms. A number of techniques for detecting the presence of a malicious blocker tag will be described elsewhere herein.

Another issue that arises in the selective blocker tag context is that blocking certain zones may automatically lead to the inadvertent blocking of other zones. For example, if IDs beginning with '0' are blocked, then the reader may never get around to reading IDs beginning with '1'. Therefore, it may be preferable in certain applications to provide a mechanism for informing the reader not to attempt to read within certain subtrees. That is, the reader needs to know when a subtree is being blocked, so that it can proceed to other parts of the tree without stalling on the blocked subtree.

A number of different techniques may be used to configure the tree-walking singulation algorithm such that it works efficiently even in the presence of selective blocker tags. Generally, such techniques configure the tree-walking singulation algorithm such that it ignores subtrees that are being blocked.

For example, when at a given node, the basic tree-walking singulation algorithm asks all tags corresponding to leaves in the subtree of that node to broadcast their "next bit," that is, the label on the next branch from the node towards the leaf in question. The basic algorithm may be augmented in accordance with the invention such that the reader first determines for a given node whether the subtree rooted at this node is being blocked. Such a determination could be made via an appropriate query generated by the reader. More specifically, the reader may in effect pose the special query: "Is the subtree rooted at this node being blocked?" If the subtree is not being blocked, then the reader would proceed to ask the standard next-bit question.

This aspect of the invention is referred to herein as "polite blocking," since the selective blocker tag is being polite by informing the reader as to which subtrees are being blocked.

Another form of polite blocking configures a given selective blocker tag to inform readers as to the particular selective blocking policy being implemented. This technique may make use of a small, designated range of "virtual" tag IDs t, t+1, . . . , t+k, each corresponding to one of a range of standard, pre-specified policies labeled 0, 1, . . . , k. In order to indicate that it is implementing privacy policy i, a selective blocker tag can simulate the presence of a tag with ID t+i. Such unary representation of policy numbers allows a reader that encounters multiple selective blocker tags to decipher the full policy set.

This policy announcement approach is generally only viable for signaling one of a relatively small set of pre-established privacy policies. It is particularly well suited for use with a small number of designated privacy zones. In general, policy announcement is less flexible than the approach of permitting any node to declare that its subtree is protected. On the other hand, it may be important not to allow selective blocker tags to implement an indiscriminately rich set of privacy policies, as a policy can then become a unique identifier, or at least distinct enough to undermine the policy of its bearer.

An important advantage of the blocker tag approach of the present invention is its very low implementation cost. The blocker tags themselves generally may be implemented using otherwise conventional RFID tags with only very slight circuit modifications to implement the functionality described above. Moreover, the tags do not require any cryptographic functionality. No significant modifications to existing consumer-product RFID tags are required. The only significant overhead costs are those associated with management of a password for each standard RFID tag, to authorize it to change privacy zones. Thus, the blocker tag approach has low overhead costs, comparable to those associated with the "kill" command approach, but is much more flexible and useful for protecting privacy.

To ensure its attractiveness as a widespread tool for protection of consumer privacy, the blocker tag will preferably create little or no disruption of normal RFID-based commercial processes like inventory control. In this context, a full blocker tag would generally be counterproductive in that it would provide privacy protection, but at the cost of indiscriminately disrupting all RFID-tag reading in its vicinity. Selective blocker tags avoid this problem, and are therefore a preferred implementation of the invention.

With the use of privacy zones in conjunction with dynamic alteration of tag IDs, it is possible to implement a range of privacy policies that simultaneously satisfy the needs of consumers and businesses. As indicated previously, tag IDs may be transferred inside or outside privacy zones depending upon the situations in which they are used.

In a simple implementation of a selective blocker tag, the privacy zone comprises the subtree of a single node, and thus corresponds to a set of IDs having a common binary prefix. An example of such a privacy zone comprising the right half of the tag ID tree, namely all serial numbers whose leading bit consists of a '1', was previously described in conjunction with FIG. 4. The following example illustrates in greater detail how a privacy zone of this type might be used in a retail setting.

EXAMPLE 1

Privateway Supermarkets makes use of selective blocker tags whose privacy zone consists of all IDs with a leading '1' bit. Packages in Privateway Supermarkets each bear an RFID tag with a unique ID used for purposes of inventory control. As initially programmed, and while an item is inside the supermarket or its warehouses, the tag ID carries a leading '0' bit. At this point, the selective blocker tags do not disrupt the ordinary reading of other tags.

When the RFID tag reader at a cash register scans an item for purchase by a customer, it also transmits a tag-specific key to the RFID tag on the item, causing the leading bit in the tag ID to flip to a '1'. The key should be secret so as to prevent an attacker from transferring tag IDs arbitrarily into the privacy zone. Privateway Supermarkets also provides its customers with free selective blocker tags. These may be available, for example, embedded in shopping bags at registers, as stickers to be placed on items, or using other suitable mechanisms.

When Alice returns home from her shopping trip to Privateway Supermarkets, she unmasks items in the privacy zone by detaching them from shopping bags or removing their privacy-enhancing stickers. To ensure that stickers no longer perform blocking when removed, they may be constructed to deactivate completely upon removal, for example, by detachment of their antennae. Bags might similarly be equipped with deactivation mechanisms. Personal blocking devices, of course, may be equipped with on/off or policy-setting switches. When the items are placed in a "smart" refrigerator, an attached RFID reader tallies the contents. By keeping track of this inventory, Alice's home computer can print out a list of items for purchase on Alice's next trip to the supermarket.

A technique such as that utilized in Example 1 above could be incorporated into an otherwise conventional EPC system of a type specified by the MIT AutoID center. See, for example, D. L. Brock, "The electronic product code (EPC): A naming scheme for objects," Technical Report MIT-AUTOID-WH-002, MIT Auto . ID Center, 2001, http://www.autoidcenter.org, which is incorporated by reference herein. An EPC comprises 96 bits, sequentially partitioned as follows: (1) an 8-bit header; (2) a 28-bit "EPC-manager" code, designating the organization that owns the tag; (3) a 24-bit "object-manager" code, designating the class of object as determined by the EPC manager; and (4) a 36-bit serial number that uniquely identifies the object.

Thus the privacy technique of Example 1 could be implemented by having one of the bits of the object-manager code designated as a standard privacy bit. All selective blocker tags could then be assigned a unique collective EPC-manager code.

Such an arrangement is reader friendly in that, to determine whether a selective blocker tag is present, a reader would initially check whether the EPC-manager code for selective blocker tags is present by following the corresponding path down the tree. Note that a selective blocker tag would simulate all EPC-manager codes, but a particular one would serve as an agreed-upon indicator of blocking. The privacy bit in the object-manager code for a tag could be flipped on or off according to the policies of the tag EPC manager.

In many cases, it would be useful to have multiple, independent privacy zones. By associating different privacy-enhancing practices with different zones, it would be possible to maintain a collection of overlapping privacy policies. Different types of selective blocker tags might then be used to implement a variety of privacy policies. This aspect of the invention will be illustrated using the following examples.

EXAMPLE 2

Suppose that the first two bits of tag IDs specify a desired privacy zone ranging from zero to three. Alice might carry a zone-one selective blocker tag in her wristwatch. So as to protect her clothing and personal appliances from scrutiny, all of these items would then be marked with a zone-one prefix.

On the other hand, Alice might like to be able to handle groceries without blocking their tags. In this case, on checkout, her grocery items could be marked with a zone-two prefix, while privacy stickers for these items carry zone-two selective blocker tags. Thus, when the stickers are removed, Alice can handle them without her wristwatch blocker tag interfering with the reading process. Alice might choose, on the other hand, for her automobile to implement the strongest level of protection, blocking RFID tag reading in all four zones.

EXAMPLE 3

As indicated previously, proposals have been made to embed RFID tags in currency. Using the techniques of the invention, IDs for these tags might be relegated to a special privacy zone for currency.

To protect the privacy of consumers, then, wallets could be equipped with embedded selective blocker tags or with credit-card-like devices bearing selective blocker tags.

The presence of a currency-zone blocker tag would be easily detectable, as will be described below. Thus, in sensitive locations like airports, law-enforcement officials could take the approach of temporarily sequestering wallets in Faraday cages during security checks. They could then detect the presence of suspicious currency-zone blocker tags. In the absence of such tags, or following their identification and removal, it would be possible to monitor large and suspicious currency flows. The particular policies are obviously a subject for debate. However, the selective blocker tags of the present invention allow one to consider a range of policies that was heretofore unattainable.

Law-enforcement officials would also be able to scan banknotes quickly and without impediment when they pass through financial institutions.

EXAMPLE 4

As indicated above, RFID tags in consumer items may be configured in accordance with the techniques of the invention so that their IDs and other highly individual data can be transferred to a privacy zone. At the same time, to facilitate recycling, tags on plastic items might carry and readily broadcast their polymer-type number, for example, a value that ranges between 1 and 7. This could be accomplished, for instance, by having a special class of RFID tags used uniquely for recycling.

A privacy risk in this approach is the effect of "clustering." In particular, the polymer numbers for a multiplicity of objects would together constitute a unique identifier. However, most common consumer items made of recyclable plastic, such as soda bottles, do not remain with a consumer in large quantities for very long.

Another possible use of multiple privacy zones, apart from the arrangements described in the foregoing examples, is in providing protection against spillover effects from selective blocker tags. For example, if Alice is carrying a selective blocker tag and standing in physical proximity to Bob, then her blocker tag may extend its disruptive effects to the reading of tags carried by Bob. While Bob may be carrying tags whose IDs lie in a privacy zone, he may wish to have full control over the circumstances in which they are shielded.

Given a reasonably large collection of privacy zones, for example, on the order of 100, every person might make use of a selective blocker tag protecting a fixed, random zone, and have his or her items marked accordingly. This would reduce the likelihood of spillover.

It is important to note that there is a tradeoff between individual privacy and the number of possible privacy zones or associated policies. At an extreme, if each blocker tag were to implement a unique policy, then the policy itself would constitute a unique identifier. Thus, the set of possible privacy zones or associated policies in a given RFID system should not be so large as to risk undermining the desired privacy protection.

Selective blocker tags in accordance with the invention may be made available from many sources. For example, merchants may include them for free with purchased goods, or consumers may be able to buy them at the checkout counter. Consumer rights organizations may supply them to consumers for nominal cost. The low implementation costs ensure that selective blocker tags may be cheaply and widely available.

As noted above, blocker tags may be used in a malicious manner, namely as a tool for mounting denial-of-service attacks. For example, a blocker tag may be misused to circumvent an intended RFID reader for illegitimate purposes, through its ability to simulate multiple tag IDs. While legitimate privacy applications of the blocker tag also simulate multiple tag IDs, the malicious blocker tag does not respect the boundaries of an allowed privacy zone.

RFID readers can be designed to cope with the intended blocker behavior within the privacy zone, but their basic functionality requires them to be able to read tags outside of this zone. Thus a malicious blocker tag effectively mounts a denial-of-service attack against the RFID reader protocol. Such attacks might be designed simply to disrupt service, or may be part of a scam used by petty thieves.

A malicious blocker tag could attempt to simulate a particular distribution of tags in order to avoid detection. Regardless of this distribution, the number of simulated tags must be large enough to delay significantly the singulation protocol.

Detection of denial-of-service blocker attacks can therefore be implemented in a straightforward manner using a threshold detection approach. In this approach, an attack is assumed to be in progress if the number of perceived RFID tags exceeds some reasonable specified threshold, such as 1,000 tags at a retail checkout line. This threshold detection approach is simple and robust, as it does not rely on the exact behavior of the malicious blocker tag. In other words, this approach would work for either universal or selective blocker tags of a malicious kind.

A more sophisticated detection technique may be implemented based on the use of prescribed tag ID ranges. For example, the reader could be connected to a database listing every valid tag in the range of IDs associated with a particular manufacturer. Such IDs may correspond, for example, to the "EPC manager" in an EPC. A tag having an ID that lies within the range but is not on the list could be identified as fraudulent. If tag IDs are at least partially random, it will be hard for an attacker to guess a valid ID. This defense is also not foolproof. For example, it does not protect against spoofing valid tag IDs that have been recorded previously by the attacker. In practice, this approach would also rely on access to manufacturer databases, which may be impractical in retail settings.

Another possible detection approach is to utilize special-purpose readers to filter out malicious blocker tags. For example, if a few readers working together could estimate the location of the tags, they could ignore a multitude of fake tag IDs originating from a single location. However, such an approach could significantly increase the cost and complexity of the readers.

As was mentioned previously, other embodiments of the invention are based on readers which utilize an ALOHA singulation algorithm. Embodiments of this type will now be described with reference to FIGS. 6 and 7.

The ALOHA singulation algorithm is generally utilized for RFID tags that operate in low frequency ranges, such as the 13.56 MHz range. Use of the ALOHA singulation algorithm in this case aims at reducing reader-to-tag communications in order to meet restrictive electromagnetic compatibility regulations. Additional details regarding an example of a standard implementation of the ALOHA singulation algorithm can be found in MIT AutoID Center, 13.56 MHz ISM band class 1 radio frequency identification tag interference specification: Candidate recommendation, version 1.0.0, Technical Report MIT-AUTOID-WH-002, 2003, http://www.autoidcenter.org, which is incorporated by reference herein. This standard employs a protocol variant known as "slotted" ALOHA in which a given tag broadcasts its ID during a designated, independent time interval known as a "slot."

The operation of the example ALOHA singulation algorithm is as follows. Let $T_i$ denote the ID of a tag i. The function $f$ denotes a general, preprogrammed function for scheduling tag responses. In the above-cited AutoID Center standard, this function $f$ is left unspecified, and presumably may be selected by individual tag manufacturers. The example ALOHA singulation algorithm involves essentially the following steps:

1. The reader broadcasts S, the number of designated slots, and a random value R.

2. Tag i computes a slot value $s_i = f(T_1, R, S) \in [0, 1, \ldots, S-1]$.

3. During slot $s_i$, tag i transmits $T_i$ to the reader.

In the event of a collision in given slot $s_i$, i.e., a simultaneous reply from multiple tags, a reader is in general unable to receive any transmission. In other words, tag transmissions are lost. The ALOHA singulation algorithm aims to avoid such collisions through randomized scheduling of replies and selection of an appropriately large slot allocation S. There are a number of techniques for addressing the problem of collisions. For example, if many collisions occur, the algorithm may be re-run with a larger value S.

An additional feature of the slotted ALOHA singulation algorithm specified by the AutoID Center is referred to as a selection mask. This is a prefix broadcast by the reader to specify a subset of tags that should respond to its query. When a k-bit selection mask σ is specified, a tag only transmits to the reader if σ is an exact prefix of $T_i$, i.e., matches the first k bits. Also, when a selection mask σ is specified, a tag transmits only the substring of its ID $T_i$ that follows σ. The selection mask is optional, and the absence of a selection mask is denoted herein by a null selection mask φ.

Blocker tags for the ALOHA singulation algorithm may operate according to essentially the same principles as those described previously in the case of the tree-walking singulation algorithm. In particular, an ALOHA blocker tag may be configured to simulate transmission collisions during selected time slots. Two illustrative approaches for producing such blocking behavior in a selective manner will now be described.

In the first approach, a privacy zone P may be specified in terms of a set of arbitrary-length prefixes $\Sigma = \{\sigma_1, \sigma_2, \ldots, \sigma_m\}$. If the reader specifies a selection mask σ such that $\sigma_i$ is a prefix of σ or vice versa, then the blocker tag simulates collisions for all slots. Otherwise the blocker remains silent. Note that if Σ is not empty and σ=φ, then the blocker will block all slots.

Figure 6:
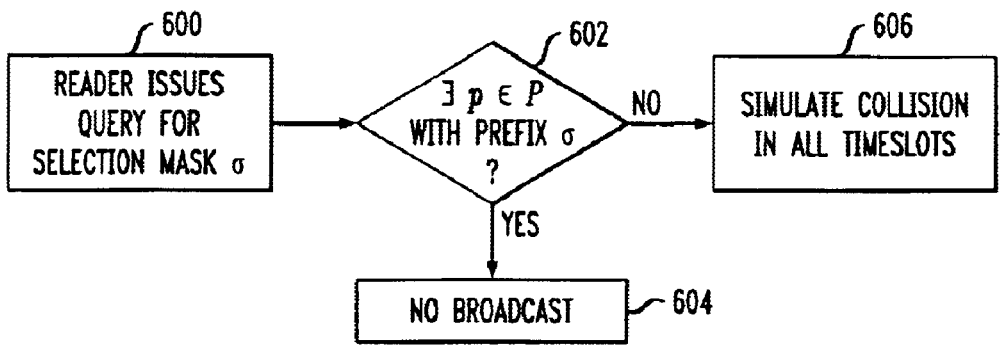

FIG. 6 is a flow diagram illustrating one possible implementation of this first approach in system 100. In step 600, reader 104 issues a query on a selection mask σ. A given one of the RFID tags 102 configured as a selective blocker tag having a privacy zone P then performs the operations shown in steps 602, 604 and 606. In step 602, the selective blocker tag determines if there exists in the privacy zone P defined by the set of arbitrary-length prefixes an element p having the prefix σ. If so, the selective blocker tag makes no broadcast, as indicated in step 604. Otherwise, the selective blocker tag simulates a collision in step 606 for all time slots.

As a more particular example of the first approach, assume that $\Sigma = \{`0', `11'\}$ for a given blocker tag. This tag will block the reading of all tags whose ID $T_i$ has a leading '0' bit or the leading pair of bits '11'. Thus, if the reader specifies any of the following selection masks, for example, then the blocker will be activated: '0', '1', '01', '110', φ. In contrast, if the reader specifies any of the following example selection masks, then the blocker will remain silent: '11', '110', '11000'.

A drawback of this approach is that in order to read all tags lying outside the privacy zone specified by Σ, the reader may have to make multiple queries. In the above example, for instance, the reader would have to make queries under selection masks '110' and '111' in order to read all tags outside the privacy zone. However, this should not be problematic provided that the privacy-zone specification Σ is suitably concise.

A second approach to blocking is possible through simulation of collisions only during selected time slots. The approach relies critically on the form of the function $f$. In order to protect tags in a privacy zone P, i.e., every tag with an ID T ∈ P, a blocker tag may simulate collisions in every time slot s such that $s = f(R, T, S)$ for some T ∈ P. In general, this approach may result in the blocking of tags outside the privacy zone P. Given suitable selection of $f$ and P, however, blocking behavior may proceed exactly as desired.

Figure 7:
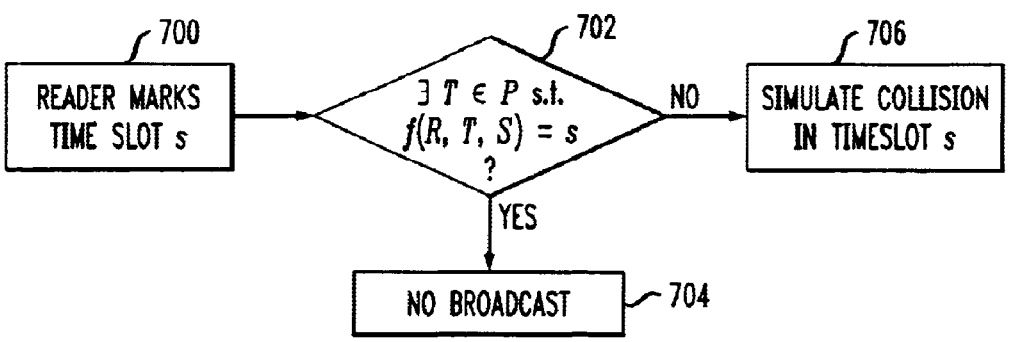

FIG. 7 is a flow diagram illustrating one possible implementation of this second approach in system 100. In step 700, reader 104 marks a time slot s. A given one of the RFID tags 102 configured as a selective blocker tag having a privacy zone P then performs the operations shown in steps 702, 704 and 706. In step 702, the selective blocker tag determines if there exists in the privacy zone P a tag ID T such that $f(R, T, S) = s$. If so, the selective blocker tag makes no broadcast, as indicated in step 704. Otherwise, the selective blocker tag simulates a collision in step 706 for time slot s.

As a more particular example of the second approach, assume that $S = 2^e$ for some value e, and that $f$ simply computes a bitwise XOR of e-bit random value R and the e-bit prefix of tag ID $T_i$. In this case, a privacy zone P can be created consisting of all tag IDs with a leading '1' bit, i.e., to permit reading only of tags whose ID carries a leading '0' bit. Let r represent the leading bit of R. The blocker tag would simply simulate a collision in any slot s whose leading bit is equal to r XOR 1.

A drawback of this second approach is its dependence on the function $f$ implemented in a given tag. Without a widely implemented choice of $f$, blockers would not be able to achieve a consistent privacy policy.

It remains valuable in ALOHA-based systems for blocker tags to block in a "polite" way, namely to specify their policies to readers. The policy-specifying technique described above for tree-walking singulation, in which a subtree is "marked" as subject to blocking, will generally not work in the ALOHA case. However, a number of other strategies are possible. An example of one such strategy will now be described.

By analogy with the virtual tag technique described previously, we may specify a special prefix σ* for blocker tags in the ALOHA case. The ID $T_i$ of a blocker tag i then assumes the form $T_i = \sigma^* \| \rho_i \| P_i$, where $\|$ denotes string concatenation. The symbol $\rho_i$ denotes a random value, of appropriate length, specific to blocker tag i. The function of $\rho_i$ is to prevent collisions between blocker tags, i.e., to randomize the computation of the slot s. $P_i$ denotes a bitstring specifying the privacy policy of the blocker tag i.

In order to learn the full set of privacy policies enforced by blocker tags within its vicinity, a reader issues an initial query under selection mask σ*. Blocker tags respond then in a manner similar to that of ordinary tags. In particular, each blocker transmits its policy $P_i$ in time slot $f(R, \rho, S)$. In contrast to an ordinary tag, a blocker does not transmit any other portion of $T_i$. The value ρ, in particular, should not be transmitted, as it would serve as a unique identifier. The reader thus receives the full set of policies of responding blockers.

A blocker policy P may assume any of a number of forms. It might, for instance, be an encoded list of nodes whose corresponding subtrees lie in the privacy zone of the blocker tag, i.e., a set Σ of blocked prefixes. As another example, it may comprise a standardized privacy-zone identifier.

It should again be emphasized that the particular selective blocking techniques described above are provided by way of illustration, and should not be construed as limiting the present invention to any specific embodiment or group of embodiments.

For example, although described in the context of tree-walking and ALOHA singulation algorithms, the blocker tags of the present invention may be implemented in systems which utilize other types of singulation algorithms, or more generally in systems which utilize other techniques for allowing a reader to determine the unique identifiers associated with various RFID devices.

In addition, the various simplifying assumptions made above in the course of describing the illustrative embodiments should also be viewed as exemplary rather than as requirements or limitations of the invention.

As was noted previously herein, a consumer or other user may wish to alter the privacy policy implemented by a blocker device either temporarily or permanently under certain circumstances. For example, a consumer may wish to disable the blocker device so as to permit unimpeded reading of RFID tags for use in the home. One way of accomplishing this is to provide a physical mechanism for setting the state of the blocker device, such as a physical dial or switch. Another is to provide an authenticated wireless protocol for blocker device policy changes. As a simple example of this latter type of approach, a blocker device might become activated or deactivated upon receiving a PIN or other form of authenticated signal from an RFID reader or other device capable of such transmission. Such arrangements generally provide a blocker device that is configurable such that a privacy policy implemented by the blocker device is selectable responsive to a command, although many other command formats and command delivery techniques may be used.

It should be noted that the selective blocking techniques of the present invention can be used with tags that enhance their identifiers by pre-pending random or pseudorandom prefixes. In such an arrangement it may be helpful to precede the random prefix by a few static bits indicating the privacy policy. For example, an identifier might take the form: privacy bit $\|$ random string $\|$ identifier. The blocker tag in this case may block if the privacy bit is a '1', but not block if the privacy bit is a '0'. The insertion of the random string would not otherwise affect the behavior of the blocker.

It should also be noted that selective blocking in accordance with the present invention may be selective not with reference to an entire identifier, but instead with reference to a portion of an identifier. A given blocker tag may thus be configured so as to restrict access to certain portions of identifiers, rather than to block the reading of a tag on an all-or-nothing basis. For example, suppose that a blocker tag wants to permit reading of product codes, but not unique identifiers. In the case of the tree-walking algorithm, then, a blocker tag might simulate collisions below a certain level in the tree. In other words, it is possible to block selectively using an "object-oriented" approach.

These and numerous other alternative embodiments within the scope of the appended claims will be readily apparent to those skilled in the art.

What is claimed is:

1. A method for providing enhanced privacy in an RFID system comprising a plurality of RFID devices, each having an associated identifier, and at least one reader which communicates with one or more of the devices, the method comprising the steps of:

receiving in a blocker device a communication directed from the reader to one or more of the RFID devices; and generating in the blocker device an output transmittable to the reader, the output simulating one or more responses from at least one of the RFID devices in a manner which prevents the reader from determining at least a portion of the identifier of at least one of the RFID devices;

wherein the blocker device is configurable to provide selective blocking of a designated subset of the identifiers for a given set of the RFID devices.

2. The method of claim 1 wherein the blocker device comprises one of the RFID devices.

3. The method of claim 1 wherein the output transmittable to the reader is generated in the blocker device based at least in part on information in the received communication.

4. The method of claim 1 wherein the output simulates responses from multiple ones of the RFID devices.

5. The method of claim 1 wherein the blocker device generates the output in such a manner that the reader is prevented from determining identifiers for only those of the RFID devices having identifiers within a designated privacy zone.

6. The method of claim 5 wherein at least one of the RFID devices has an identifier which is modifiable such that the identifier is transferable from outside the privacy zone to within the privacy zone upon the occurrence of a specified event.

7. The method of claim 5 wherein at least one of the RFID devices has an identifier which is modifiable such that the identifier is transferable from within the privacy zone to outside the privacy zone upon the occurrence of a specified event.

8. The method of claim 1 wherein the reader utilizes a singulation algorithm to determine the identifiers of the RFID devices.

9. The method of claim 8 wherein the singulation algorithm comprises a tree-walking singulation algorithm.

10. The method of claim 9 wherein the communication from the reader comprises a query specifying at least a subset of the identifiers, and further wherein the blocker device first determines if any of the identifiers in the subset are within a designated privacy zone, and if so generates the output simulating one or more responses from at least one of the RFID devices.

11. The method of claim 9 wherein the output simulating one or more responses from at least one of the RFID devices comprises a broadcast of a signal representing the presence of RFID device identifiers at least one of which carries a '0' bit in a given position and at least one of which carries a '1' bit in the same position.

12. The method of claim 8 wherein the singulation algorithm comprises an ALOHA singulation algorithm.

13. The method of claim 12 wherein the communication from the reader comprises a query involving a selection set specification, and further wherein the blocker device first determines if an identifier in a designated privacy zone has at least a portion thereof corresponding to the selection set specification, and if so generates the output simulating one or more responses from at least one of the RFID devices.

14. The method of claim 12 wherein a privacy zone P is specified in terms of a set of arbitrary-length prefixes $\Sigma=\{\sigma_1, \sigma_2, \ldots, \sigma_m\}$, and wherein the blocker device generates the output only if a selection mask $\sigma$ specified by the reader is such that $\sigma_i$ is a prefix of $\sigma$ or vice versa.

15. The method of claim 12 wherein the communication from the reader comprises a communication designating a particular time slot, and further wherein the blocker device first determines if there exists an identifier in a designated privacy zone such that a function of the identifier evaluates to the particular time slot, and if so generates the output simulating one or more responses from at least one of the RFID devices within the particular time slot.

16. The method of claim 15 wherein the generated output simulates collisions in every time slot s for which $s=f(R, T, S)$, where $f$ is the function, R denotes a random or pseudo-random value, T denotes an identifier in a privacy zone P, and S denotes a slot allocation of the ALOHA singulation algorithm.

17. The method of claim 1 wherein the blocker device is configured to communicate to the reader information specifying a particular selective blocking policy being implemented by the blocker device.

18. The method of claim 17 wherein the system supports a number of virtual identifiers denoted $t, t+1, \ldots, t+k$, each corresponding to one of a plurality of selective blocking policies $0, 1, \ldots, k$, and further wherein the blocker device communicates to the reader that it is implementing a particular selective blocking policy i by generating the output so as to simulate a response from an RFID device having identifier $t+i$.

19. The method of claim 17 wherein a designated prefix $\sigma^*$ is utilized to identify any of the devices configured to implement a selective blocking policy, the reader determining any devices so configured by issuing a query having a selection mask corresponding to the designated prefix $\sigma^*$.

20. The method of claim 17 wherein the blocker device has an identifier of the form $T_i=\sigma^*\|\rho_i\|P_i$, where $\|$ denotes string concatenation, $\rho_i$ denotes a random value specific to the blocker device, and $P_i$ denotes the selective blocking policy implemented by the blocker device.

21. The method of claim 1 wherein the reader is operative to detect the presence of the blocker device by determining if a number of perceived RFID device identifiers exceeds a specified threshold.

22. The method of claim 1 wherein the reader is operative to detect the presence of the blocker device by accessing a database listing valid identifiers in a given range of RFID device identifiers, and determining that the blocker device is present upon detection of an RFID device having an identifier not in the database of valid identifiers.

23. The method of claim 1 wherein the blocker device is configurable such that a privacy policy implemented by the blocker device is selectable responsive to a command.

24. A method for providing enhanced privacy in an RFID system comprising a plurality of RFID devices, each having an associated identifier, and at least one reader which communicates with one or more of the devices, the method comprising the steps of:
  receiving in a blocker device a communication directed from the reader to one or more of the RFID devices; and
  generating in the blocker device an output transmittable to the reader, the output simulating one or more responses from at least one of the RFID devices in a manner which prevents the reader from determining at least a portion of the identifier of at least one of the RFID devices;
  wherein the blocker device comprises a selective blocker tag and the generated output simulates responses of only a subset of all possible identifiers for a given set of RFID devices.

25. A method for providing enhanced privacy in an RFID system comprising a plurality of RFID devices, each having an associated identifier, and at least one reader which communicates with one or more of the devices, the method comprising the steps of:
  receiving in a blocker device a communication directed from the reader to one or more of the RFID devices; and
  generating in the blocker device an output transmittable to the reader, the output simulating one or more responses from at least one of the RFID devices in a manner which prevents the reader from determining at least a portion of the identifier of at least one of the RFID devices;
  wherein the blocker device communicates to the reader information specifying a particular subset of a given set of RFID devices for which the reader will be unable to singulate identifiers.

26. A method for providing enhanced privacy in an RFID system comprising a plurality of RFID devices, each having an associated identifier, and at least one reader which communicates with one or more of the devices, the method comprising the steps of:
  receiving in a blocker device a communication directed from the reader to one or more of the RFID devices; and
  generating in the blocker device an output transmittable to the reader, the output simulating one or more responses from at least one of the RFID devices in a manner which prevents the reader from determining at least a portion of the identifier of at least one of the RFID devices;

wherein the reader is operative to detect the presence of the blocker device, and to determine if the blocker device is operating as a selective blocker device or a full blocker device.

27. The method of claim 26 wherein the blocker device comprises a full blocker tag and the generated output simulates all possible identifiers for a given set of RFID devices.

28. A method for providing enhanced privacy in an REID system comprising a plurality of RFID devices, each having an associated identifier, and at least one reader which communicates with one or more of the devices, the method comprising the steps of;

receiving in a blocker device a communication directed from the reader to one or more of the REID devices; and generating in the blocker device an output transmittable to the reader, the output simulating one or more responses from at least one of the RFID devices in a manner which prevents the reader from determining at least a portion of the identifier of at least one of the RFID devices;

wherein the reader is operative to detect the presence of the blocker device by interacting with one or more other readers to determine information specifying the physical locations of at least a subset of the RFID devices, and processing the determined location information to ascertain if the blocker device is present.

29. An apparatus for providing enhanced privacy in an RFID system, the system comprising a plurality of RFID devices, each having an associated identifier, and at least one reader which communicates with one or more of the devices, the apparatus comprising:

a blocker device operative to receive a communication directed from the reader to one or more of the RFID devices, and to generate an output transmittable to the reader, the output simulating one or more responses from at least one of the RFID devices in a manner which prevents the reader from determining at least a portion of the identifier of at least one of the RFID devices;

wherein the blocker device is configurable to provide selective blocking of a designated subset of the identifiers for a given set of the RFID devices.

30. An RFID system comprising:

a plurality of RFID devices, each having an associated identifier; and at least one reader which communicates with one or more of the devices;

wherein a blocker device is operative to receive a communication directed from the reader to one or more of the RFID devices, and to generate an output transmittable to the reader, the output simulating one or more responses from at least one of the RFID devices in a manner which prevents the reader from determining at least a portion of the identifier of at least one of the RFID devices; and wherein the blocker device configurable to provide selective blocking of a designated subset of the identifiers for a given set of the RFID devices.

31. An apparatus for providing enhanced privacy in an RFID system, the system comprising a plurality of RFID devices, each having an associated identifier, the apparatus comprising:

at least one reader which communicates with one or more of the devices;

wherein a blocker device of the system is operative to receive a communication directed from the reader to one or more of the RFID devices, and to generate an output transmittable to the reader;

wherein the reader is configured to receive from the blocker device information specifying a particular selective blocking policy being implemented by the blocker device.

* * * * *

UNITED STATES PATENT AND TRADEMARK OFFICE
CERTIFICATE OF CORRECTION

PATENT NO. : 6,970,070 B2
DATED : November 29, 2005
INVENTOR(S) : Ari Juels et al.

It is certified that error appears in the above-identified patent and that said Letters Patent is hereby corrected as shown below:

Column 20,
Line 22, insert -- is -- after "device".

Signed and Sealed this

Twenty-fourth Day of January, 2006

JON W. DUDAS
*Director of the United States Patent and Trademark Office*